Patented May 14, 1946

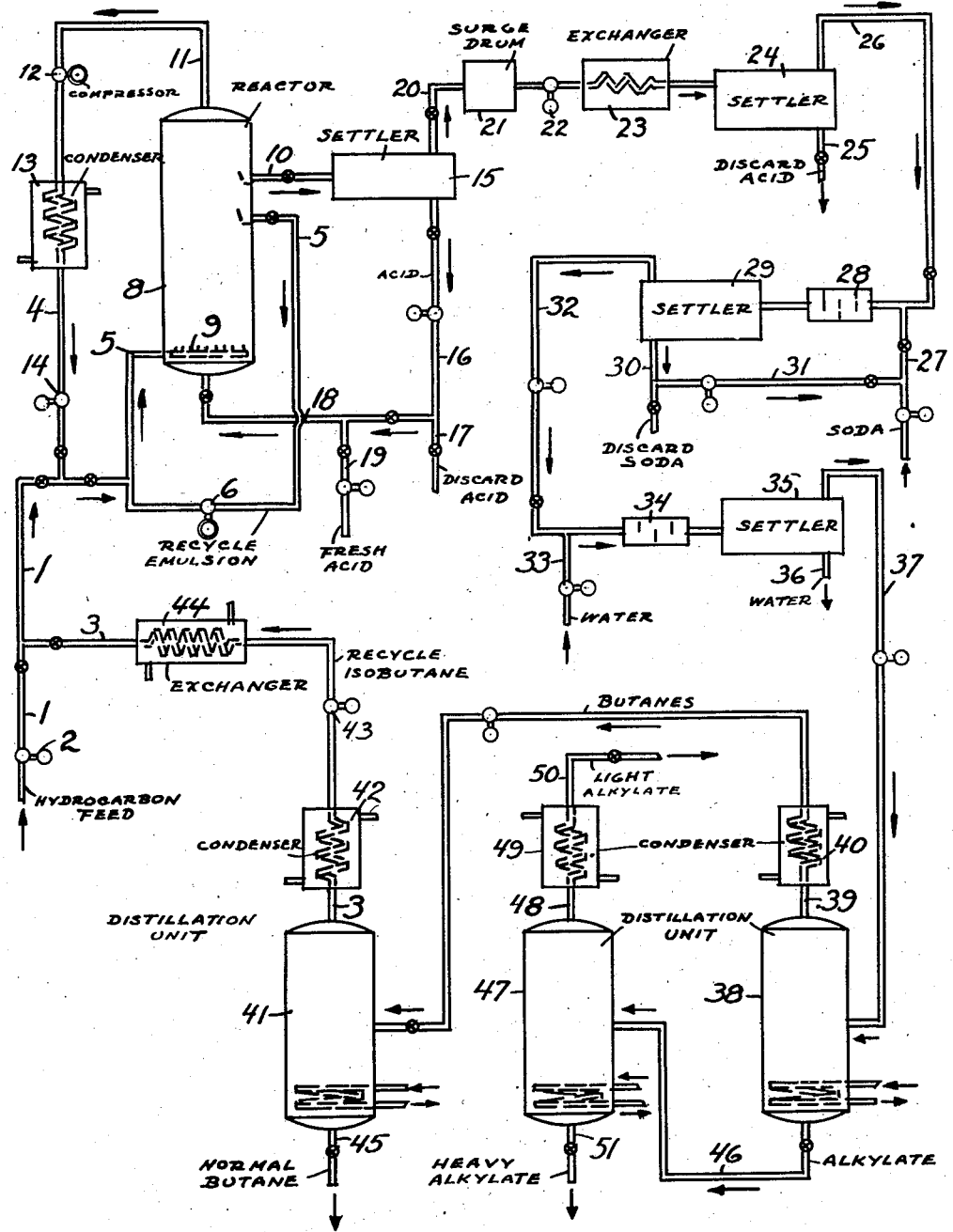

2,400,367

UNITED STATES PATENT OFFICE 2,400,367

ALKYLATION PROCESS

Karl Opryshek and John N. Chatfield, Baytown, Tex., assignors to Standard Oil Development Company, a corporation of Delaware Application August 2, 1941, Serial No. 405,128

3 Claims. (Cl. 260—683.4)

The present invention is concerned with the production of normally liquid saturated hydrocarbons suitable for use as motor fuels by a process which involves the condensation of isoparaffinic hydrocarbons with olefin hydrocarbons in the presence of a suitable catalyst. In accordance with the present invention, the acid emulsion for recycling and the acid emulsion for recovery of the alkylate are withdrawn as separate streams from the reaction zone.

It is known in the art that saturated hydrocarbons containing a tertiary carbon atom, hereinafter referred to as tertiary hydrocarbons, will react with olefins in the presence of a suitable catalyst such as concentrated mineral acids, resulting in the production of a wide range of higher boiling hydrocarbon products. The nature of these reactions varies widely with the reaction conditions and with the particular type and character of feed materials and catalyst employed. The feed stocks employed in reactions of this character vary considerably. The tertiary hydrocarbon constituents of the feed stock usually comprise isobutane, isopentane, and similar higher branched chain homologues containing at least one tertiary carbon atom per molecule. The olefinic reactants generally comprise propylene, normal butylenes, isobutylene, trimethyl ethylene, the isomeric pentenes and similar higher monoolefinic hydrocarbons of either a straight chain or branched chain structure. Mixtures of two or more of these mono-olefins are likewise employed. Operations are conducted in which the feed material comprises particular refinery butane cuts segregated from various cracking and distillation operations, such as propane, butane and pentane cuts which comprise constituents boiling in the respective boiling ranges. Other feed materials may comprise various polymers, copolymers, interpolymers, and crosspolymers of the above mentioned olefins, such products being, for example, diisobutylene, triisobutylene, tetraisobutylene, the codimer, cotrimer and cotetramer of normal butylenes and isobutylene, the interdimer, intertrimer and intertetramer of isobutylene with pentenes.

The catalyst generally employed comprises a concentrated mineral acid as, for example, a sulfuric acid, a halogenated sulfuric acid, an acid of phosphorus, or an equivalent acid. Other catalysts utilized are a saturated aqueous solution of boron fluoride, the metal halides, such as aluminum halide and iron halide, acid activated clays, as well as the mineral acids, employed in conjunction with various compounds of the Fifth Group of the Periodic System, the aluminum halide-alkali metal halide double salt complexes, and various other similar catalysts. When a mineral acid is utilized as the catalyst, the acid concentration is above about 80%, preferably in the range from about 90% to about 100%. Although a wide range of operating temperatures are employed when utilizing mineral acid catalysts, the reaction is usually conducted at a relatively low temperature, that is, of the order of about 0° F. to about 100° F., preferably between about 35° F. and about 70° F.

The time of the reaction varies considerably but, in general is in the range from about 5 minutes to about 2½ hours or longer depending upon related operating conditions. Usually the reaction time is in the range from about 10 to about 90 minutes.

The reaction may be carried out in the vapor phase but is generally conducted in the liquid phase. In a liquid phase operation, the pressures are at least sufficient to keep the respective reactants from vaporizing and are usually in the range from about 1 to about 12 atmospheres, although pressures as high as 100 atmospheres may be employed depending upon the reaction temperature, charge stock, and catalyst employed.

Equal molecular quantities of the isoparaffin and mono-olefin may be used. However, it has been found that it is desirable to maintain a substantial excess of the tertiary hydrocarbon in the reaction zone and to operate in a reaction medium containing more than 5 volume per cent of the catalyst composition. For example, in an operation wherein isobutane or isopentane is employed as the isoparaffinic reactant, the mol ratio in fresh feed ranges from about 1 to as high as 30 mols and higher of isoparaffin per mol of mono-olefins present.

Although various catalysts are employed in operations of this character, a preferred catalyst comprises concentrated sulfuric acid having a concentration in the range from about 80% to about 100%. In conventional alkylation operations employing a catalyst of this type, it is common practice to withdraw from the reaction zone at or near its top a single stream of acid-hydrocarbon reaction mixture. This mixture is subsequently split into two streams, one stream being recycled to the reaction zone and the other being discharged into a settler wherein the acid is separated from the hydrocarbon and the latter is segregated for recovery of the desired reaction product. This type of operation is not entirely satisfactory because the recycle emulsion stream and the product emulsion stream are of the same composition, thereby causing the process to lack flexibility. We have now devised an improved process in which flexibility of control is obtained, and which, as a result, achieves the production of greater quantities of the most desired hydrocarbon reaction products.

In accordance with our invention, the acid emulsion for recycling and the acid emulsion from which the alkylate is recovered are withdrawn as separate streams from the reaction zone. In a preferred modification of this invention, the acid emulsion for recycling is withdrawn from the reaction zone at a point intermediate between the point where the reaction mixture enters and the point where the emulsion for product recovery is withdrawn from that zone. Preferably, the reaction mixture is introduced at or near the bottom of the reaction zone, the acid emulsion for product recovery is discharged at or near the top of the reactor, and the emulsion recycle stream is withdrawn from the reactor at a point below the product stream discharge. By withdrawing the emulsion recycle stream from the reactor at an intermediate point in this manner, greater flexibility is provided in the process. This type of operation appreciably reduces the amount of catalyst carried out into the settling zone while maintaining a comparatively large amount of catalyst in the emulsion recycle stream. Usually the ratio of acid to hydrocarbons in the emulsion recycle stream will be from 1:2 to 2:1 whereas the ratio of acid to hydrocarbons in the emulsion stream carried out into the settling zone will be considerably lower, such as from 1:20 to 1:4. Thus, the handling of increased quantities of hydrocarbon feed stock is possible without the necessity of providing increased settler capacity, or, in the design of new equipment, a settler of reduced size will be found adequate. Means of improving the quality of the alkylate product is provided in this improved process inasmuch as greater quantities of the isoparaffinic hydrocarbons can be charged to the reaction zone without requiring increased settler capacity. Thus, increased ratios of isoparaffinic hydrocarbons are obtained in the reaction zone, and improvement in product quality results. The process of our invention may be readily understood by reference to the drawing illustrating an embodiment of the same.

Referring specifically to the drawing, it is assumed for the purpose of illustration that the hydrocarbon feed comprises a refinery butane cut comprising butane, isobutane, isobutylene, alpha-butylene, and beta-butylene. The hydrocarbon feed is introduced into the system by means of line 1 and pump 2. As this feed flows through line 1 it is admixed with recycled isobutane, introduced by means of line 3, and recycled autorefrigeration condensate introduced by means of line 4, before being injected into the emulsion recycle stream 5 between emulsion recycle pump 6 and insulated reactor 8. The volume ratio of isobutane to total olefins in the hydrocarbon feed mixture at the point of injection into line 5 is preferably in the range between about 4:1 and 30:1. The emulsion recycle stream 5 containing the injected hydrocarbons is discharged into the bottom of reactor 8 through jets 9. Although jets are preferred, other equivalent means of dispersing the acid and hydrocarbons into an emulsion may be employed, such as turbo mixers, orifice mixers, mechanical agitators, or baffle plates.

The reaction mixture flows upwardly through reactor 8 with part of it discharging through emulsion-for-recycle draw-off line 5 and part of it discharging through emulsion-for-product draw-off line 10. The temperature of the reaction mixture in reactor 8 is maintained at a desired level, usually in the range between 15° F. and 100° F., preferably in the range between about 35° F. and about 70° F. In general, the lower the temperature of alkylation, the lower will be the acid consumption. The heat of reaction is removed from the reaction mixture by autorefrigeration means which comprises evaporating part of the hydrocarbons in the reactor, removing them overhead through line 11, compressing them by means of compressor 12, condensing them by means of condenser 13, and returning them to the bottom of the reactor 8 by means of pump 14, lines 4 and 5, and jets 9. The refrigeration is distributed throughout reactor 8 by withdrawing therefrom part of the acid hydrocarbon emulsion and recycling it by means of line 5 and pump 6 to the bottom of the reactor by means of jet 9. In accordance with this invention, the emulsion-for-recycle is withdrawn from reactor 8 at a level intermediate between the level at which the emulsion enters the reactor and the level at which the emulsion-for-product is discharged from the reactor. The emulsion-for-recycle draw-off is preferably located at least two feet below the level at which the emulsion-for-product is withdrawn from the reactor.

The quantity of acid-hydrocarbon emulsion withdrawn from and recycled to reactor 8 by means of line 5 and pump 6 varies somewhat with the reaction time and the degree of distribution of refrigeration desired in the reaction zone. In general, the volume ratio of the acid-hydrocarbon emulsion recycled as compared to the hydrocarbon feed is in the range between about 2 to 1 and 100 to 1, preferably in the range between 5 to 1 and 20 to 1. The volume ratio of acid to hydrocarbons in the reaction mixture and in the emulsion recycle stream is preferably in the neighborhood of about 1 to 1 but it may vary in the range from about 1 to 2 to about 3 to 1.

The emulsion-for-product recovery which is discharged from reactor 8 through line 10 is passed to settler 15 wherein the emulsion separates into two layers, an acid phase and a hydrocarbon phase. Under equilibrium conditions, the quantity of hydrocarbon in the emulsion discharged into settler 15 is equivalent to approximately the quantity of hydrocarbon feed introduced into the reaction system through lines 1 and 3. The volume ratio of the acid to hydrocarbon in the emulsion-for-product stream discharging into settler 15 varies with the quantity of emulsion recycled, the hydrocarbon feed rate and the depth in the reactor at which the emulsion-for-recycle draw-off is located below the emulsion-for-product draw-off. In general, this ratio varies between about 1 to 15 and 1 to 1 and is usually between about 1 to 9 and 1 to 4.

The acid phase separating in settler 15 is withdrawn through line 16, with a small portion of it being discarded through line 17 and the balance being recycled to the bottom of reactor 8 by means of line 18. The quantity of acid discarded from the system varies with the conditions of operation and is sufficient in quantity so that when replaced with approximately an equivalent amount of fresh make-up acid introduced by means of line 19 the acid in the reaction mixture is maintained at a strength of at least 80%, preferably at a strength between 90% and 100%.

The hydrocarbon phase separated from the emulsion discharged into settler 15 comprises normal butane, isobutane, and total alkylate. This hydrocarbon phase is withdrawn from the settler by means of line 20 in which are located surge drum 21, pump 22, and heat exchanger 23. As the hydrocarbon phase passes through exchanger 23, part of the refrigeration contained therein is recovered by indirect heat exchange with a liquid that is to be cooled before the hydrocarbons are discharged into settler 24. In settler 24, any entrained acid contained in the hydrocarbon phase is settled out and withdrawn from the settler through line 25. The hydrocarbon mixture withdrawn from settler 24 by means of line 26 is mixed with soda solution introduced by means of line 27, and then passed through incorporator 28 before being introduced into settler 29. For purpose of description, it is assumed that the soda solution comprises an aqueous solution of sodium hydroxide. However, any alkaline solution suitable for the purpose may be employed. The soda solution separates from the hydrocarbon mixture in settler 29 and is withdrawn through line 30, a small portion of it being discarded and the balance recycled to line 27 by means of line 31. The soda washed hydrocarbons withdrawn from settler 29 by means of line 32 are mixed with water, introduced through line 33, and then passed through incorporator 34 before being introduced into settler 35. In settler 35 the water separates from the hydrocarbons and is withdrawn through line 36.

The water washed hydrocarbons removed from settler 35 by means of line 37 are charged to distillation unit 38 wherein the butanes, both the normal and the iso, are removed overhead through line 39, condensed in condenser 40, and then introduced into distillation unit 41. In distillation unit 41, the isobutane is separated from the normal butane and is removed overhead through line 3 in which are located condenser 42, pump 43 and heat exchanger 44. After being liquefied in condenser 42, the isobutane is further cooled in heat exchanger 44 before being injected in the hydrocarbon feed line 1 whereby it is recycled to the reaction zone. The normal butane is removed from distillation unit 41 as a residue which is withdrawn through line 45. The normal butane segregated in this manner may be further treated or utilized in any desirable manner.

The residue withdrawn from distillation unit 38 by means of line 46 comprises the desired reaction products and is commonly known as the total alkylate. This total alkylate is introduced into distillation unit 47 wherein the conditions of temperature and pressure are adjusted so as to remove overhead by means of line 48 a hydrocarbon product having a final boiling point of about 290° F. to about 320° F. and an octane number in the range from about 90 to about 96. This overhead stream is condensed in condensing zone 49 and is then withdrawn from the system by means of line 50. The bottoms product withdrawn by means of line 51 comprises a fuel boiling in the range from about 320° F. to about 500° F. and having an octane number in the range from about 75 to about 85. These reaction products may be further refined or handled in any manner desired.

The process of the present invention may be widely varied. It is to be understood that the respective zones may comprise any suitable number and arrangement of units. It is also to be understood that indirect cooling may be employed in a reaction in which an insulated reaction zone is utilized. In an operation of this character the reaction products are withdrawn from the top of the reaction zone while the recycled emulsion is withdrawn at an intermediate point from the reaction zone.

The invention essentially comprises withdrawing the recycle emulsion from a point intermediate the point at which the feed mixture is introduced into the reaction zone and the alkylated product withdrawn. As pointed out heretofore conventional operating conditions may be employed.

The process of our invention has been described in conjunction with the use of a specific condensation catalyst, namely, concentrated sulfuric acid. However, it is to be distinctly understood that other equivalent catalysts, such as a halosulfonic acid, a saturated aqueous solution of boron trifluoride, and phosphoric acid may be employed in the process.

What we claim as new and wish to protect by Letters Patent is:

1. Process for reacting olefins with isoparaffins which comprises passing a feed mixture comprising olefins, isoparaffins, and an alkylating catalyst into the bottom of a reaction zone, maintaining said reaction zone under alkylating conditions, withdrawing from the upper section of said reaction zone a stream containing alkylated products and the alkylating catalyst, separating the catalyst and recovering the alkylated products, recycling said separated catalyst to the bottom of said reaction zone, withdrawing from an intermediate point of said reaction zone a catalyst emulsion, and recycling said catalyst emulsion to the bottom of said reaction zone with the fresh catalyst.

2. Process as defined by claim 1 in which said catalyst emulsion stream is recycled to the bottom of said reaction zone along with the fresh feed.

3. Process as defined by claim 1 in which said alkylating catalyst comprises concentrated sulfuric acid.

KARL OPRYSHEK.
JOHN N. CHATFIELD.